Dec. 10, 1968 E. ARGOUDELIS 3,416,104

BAND-PASS CRYSTAL FILTERS

Filed May 5, 1965 2 Sheets-Sheet 1

INVENTOR.
EVANGELOS ARGOUDELIS
BY Jerome Goldberg
ATTY.

Dec. 10, 1968

E. ARGOUDELIS 3,416,104

BAND-PASS CRYSTAL FILTERS

Filed May 5, 1965

2 Sheets-Sheet 2

INVENTOR.

EVANGELOS ARGOUDELIS

BY Jerome Goldberg

ATTY.

United States Patent Office 3,416,104
Patented Dec. 10, 1968

3,416,104
BAND-PASS CRYSTAL FILTERS
Evangelos Argoudelis, Chicago, Ill., assignor to Filtech Corporation, Franklin Park, Ill., a corporation of Illinois
Filed May 5, 1965, Ser. No. 453,443
11 Claims. (Cl. 333—72)

This invention relates to frequency band-pass filters and more particularly to frequency band-pass crystals filters. Still more particularly, this invention relates to crystal filters used in single-sideband transmission systems.

In a single-sideband transmission system, a filter is necessary to pass either the upper or lower-sideband for transmission and to reject frequencies outside said passed sideband. In the advanced single-sideband equipment, the filter required is usually a type of crystal filter.

Heretofore, single-sideband crystal filters normally used for obtaining highly selective and narrow band-pass frequency responses included a plurality of substantially identical symmetrical half sections. Each of the symmetrical half sections individually would provide a frequency response substantially symmetrical from the same center frequency. The addition of half sections to a crystal filter of this type would correspondingly increase the selectivity and the attenuation substantially the same on the high and the low side of the overall frequency response for the crystal filter. However, an undesirable feature of these crystal filters was the number of crystal elements necessary to provide the required band-pass frequency characteristics.

In particular, an embodiment of the invention herein is an improvement over a prior type single-sideband crystal filter which is illustrated in my copending application, entitled "Improved Crystal Filter," Ser. No. 360,521, filed on Apr. 17, 1964, now abandoned, and designated by the numeral 2 in FIGURE 1 therein. This prior crystal filter required eighteen piezoelectric crystal elements to provide a frequency response having an attenuation of at least 60 decibels for frequencies below 1,749.70 kilocycles and above 1,754.50 kilocycles and a maximum attenuation of 1.5 decibels between 1,750.35 to 1,753.40 kilocycles. With the invention herein, a crystal filter meeting these same specifications is produced with only twelve piezoelectric crystal elements.

The obvious advantages of less crystals are apparent to anyone skilled in the art. Among other advantages, it would provide a more economical manufactured filter, decrease the physical size and decrease the possible number of spurious responses which occur when crystal elements vibrate.

It is therefore a primary object of this invention to provide a crystal filter using less piezoelectric crystal elements than were previously necessary in order to meet the same frequency attenuation and selectivity requirements. A related object is to provide a crystal filter for single side band transmission needing less piezoelectric crystal elements than were previously necesary in order to meet the same frequency attenuation and selectivity requirements.

It is another object to provide a filter including an unsymmetrical half section with a frequency band-pass response that is substantially more selective on the high frequency than on the low frequency side and coupled to an unsymmetrical half section with a frequency band-pass response that is substantially more selective on the low frequency than on the high frequency side for producing a substantially symmetrical band-pass frequency response.

It is still another object to provide a crystal filter including an unsymmetrical half section with a frequency band-pass response that is substantially more selective on the low frequency side than on the high frequency side and coupled to an unsymmetrical half section with a frequency band-pass response that is substantially more selective on the high frequency than on the low frequency side. It is a related object to provide a crystal filter constructed as in the immediately prior object that produces a substantially symmetrical band-pass frequency response.

It is still another object to provide a crystal filter comprising a symmetrical full section coupled to an unsymmetrical half section with a frequency response that is substantially more selective on one side than on the other side of its frequency band-pass response for producing an overall frequency response which is more selective on the side of the band-pass said half section is more selective.

It is still yet another object to provide a crystal filter comprising a plurality of substantially similar full sections that produce a substantially symmetrical overall band-pass frequency response. Each of the full sections includes an unsymmetrical half section with a frequency band-pass response that is substantially more selective on the low frequency side than on the high frequency side and coupled to an unsymmetrical half section with a frequency band-pass response that is substantially more selective on the high frequency than on the low frequency side.

A primary feature of this invention is to provide a crystal filter comprising an unsymmetrical half section including; a first and a second crystal element resonating respectively at a high and a low frequency near the high and low frequency sides of the overall filter band-pass frequency response and essentially forming the band-pass of the half section, and a third and fourth crystal element each resonating at a frequency to provide substantially greater selectivity on the low frequency side than on the high frequency side of the half section band-pass.

Another primary feature is to provide a crystal filter comprising an unsymmetrical half section including; a first and a second crystal element resonating respectively at a high and a low frequency near the high and low frequency sides of the overall filter band-pass frequency response and essentially forming the band-pass of the half section, and a third and fourth crystal element each resonating at a frequency to provide substantially greater selectivity on the high frequency side than on the low frequency side of the half section band-pass.

For the purpose of facilitating an understanding of the invention, the accompanying drawings illustrate a preferred embodiment thereof, from an inspection of which, when considered in connection with the following description, the invention, its mode of construction, assembly and operation and other objects, features and advantages can be readily understood and appreciated.

Referring to the drawings, in which like characters of reference indicate corresponding or similar parts throughout the several figures of the drawings.

Figures 1, 2, 3, 4, 5:
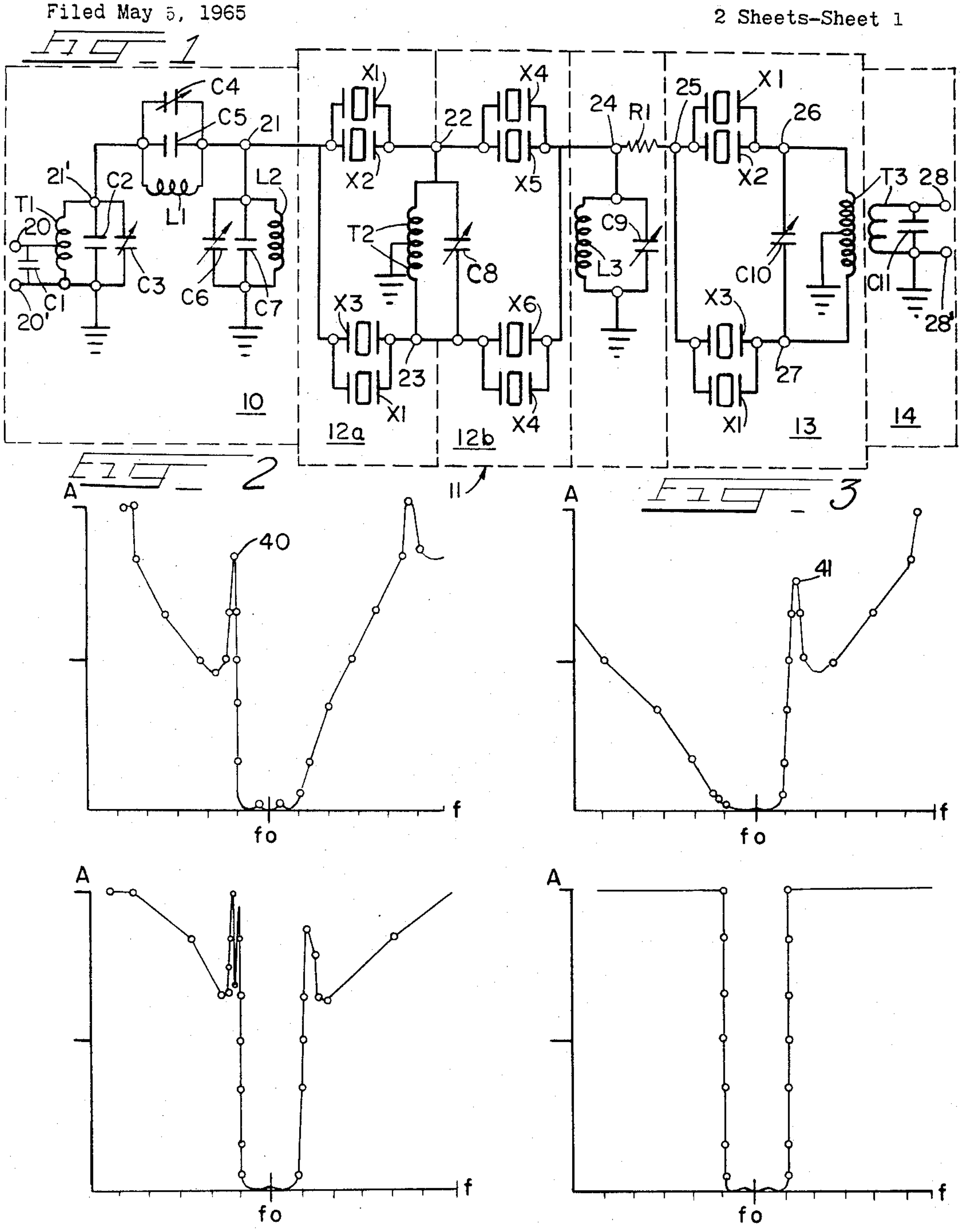
FIG. 1 is the schematic diagram of the crystal filter arrangement embodying the principles of this invention.
FIG. 2 is the frequency versus attenuation response curve for the unsymmetrical half section **12*a* and the unsymmetrical half section 13** in FIG. 1.
FIG. 3 is the frequency versus attenuation response curve for the unsymmetrical half section **12*b*** in FIG. 1.
FIG. 4 is the frequency versus attenuation response curve for the symmetrical full section 12 in FIG. 1.
FIG. 5 is the overall frequency versus attenuation response curve for the crystal filter arrangement of FIG. 1 as seen from output terminals 28, 28'.

With reference now to the drawings, there is illustrated in FIG. 1 a crystal filter arrangement, in which are incorporated the principles of the subject invention, for passing a narrow frequency band of electrical signals from a source having a relatively wide frequency band of electrical signals. As shown, this crystal filter arrangement comprises an input circuit 10, a crystal filter network 11 and an output circuit 14. The wide frequency band is coupled into the filter arrangement between input terminals 20, 20' and the passed narrow frequency band is received between output terminals 28, 28'. The overall frequency response as seen from output terminals 28, 28' is illustrated in FIG. 5.

The input circuit 10 matches the impedance of the source supplying the wide frequency band to the impedance of the crystal filter network 11. In addition, the input circuit 10 serves as a "spur" rejection filter which will be explained later in the description. The wide frequency band of signals is coupled through input circuit 10 and into the crystal filter network 11 via terminal 21 to ground.

The crystal filter network 11 is designed to pass the narrow frequency band of electrical signals and to attenuate the remainder of the wide frequency band of electrical signals to at least a particular minimum level. Crystal filter network 11 comprises a full section 12 and a half section 13. Full section 12 includes a first unsymmetrical half section **12*a* connected essentially between terminals 21, 22 and 23 and a second unsymmetrical half section 12*b* connected essentially between terminals 22, 23 and 24**.

As shown in FIG. 2, half section **12*a* has a band-pass frequency response that is substantially more selective on the low frequency side than on the high frequency side. With reference to FIG. 3, it is seen that half section 12*b* has a band-pass response that is substantially more selective on the high frequency side than on the low frequency side. When half sections 12*a* and 12*b*** are combined, the substantially symmetrical response in FIG. 4 is produced.

Full section 12 is the basic filter section to which other substantially identical full sections may be connected in order to achieve more frequency selectivity or attenuation. However, additional full sections would only be used in the event a half section connected to the basic full section filter would not satisfy the filter design requirements.

The third unsymmetrical half section 13 is connected essentially between terminals 25, 26 and 27. Half section 13 is substantially identical to the first half section of full section 12 and likewise has a frequency response that is substantially more selective on the low frequency side than on the high frequency side (see FIG. 2). Half section 13 (see FIG. 2) when added to full section 12 (see FIG. 4) substantially increases the attenuation to provide the overall frequency response shown in FIG. 5 for the crystal filter arrangement of FIG. 1. Furthermore, since the frequency response of half section 13 is substantially more selective on the low frequency side, the overall response of FIG. 5 is therefore, more selective on the low frequency side of the band-pass. Although, the greater selectivity on the low frequency side is not readily ascertained without making accurate comparison measurements of FIGS. 4 and 5, the data presented later in the description adequately illustrates this point. However, to anyone skilled in the art, an increase in selectivity on the low side is an expected result when a network having the frequency response of FIG. 2 is connected to a network with a frequency response of FIG. 4.

The first half section **12*a*, the second half section 12*b* and the third half section 13** each includes a first leg and a second leg. The first leg includes a first piezoelectric crystal element which resonates at a high frequency near the high frequency side of the band-pass of the crystal filter arrangement (see FIG. 5). The second leg includes a second piezoelectric crystal element which resonates at a low frequency near the low frequency side of the band-pass of the crystal filter arrangement. The first and second crystal elements essentially form the frequency band-pass for the half sections.

The first and second legs further comprise a third and fourth piezoelectric crystal element respectively. These crystal elements are essentially the selectivity forming elements and resonate at frequencies to provide greater selectivity on one side than on the other side of the band-pass of the half section. If increased selectivity is desired on the high frequency side of the band-pass of the half section, the third and fourth crystal elements are chosen to resonate at a frequency near or equal to the resonant frequency of said first crystal element. On the other hand, if increased selectivity is desired on the low frequency side of the band-pass, the third and fourth crystal elements would be selected to resonate at a frequency near or equal to the resonant frequency of the second crystal element.

The selectivity forming crystals (third and fourth crystal elements) in addition enlarge and flatten the frequency band-pass section of the half section response and likewise contribute to the overall frequency response for a filter that comprises more than one half section. To fully utilize this feature, however, the selectivity forming crystals should resonate at a frequency slightly less than the low frequency band-pass forming crystal for half sections having substantially greater selectivity on the low frequency side of the half section frequency response. Conversely, the selectivity forming crystals should resonate at a frequency slightly greater than the high frequency band-pass forming crystal for half sections having substantially greater selectivity on the high frequency side of the half section frequency response.

The first and second legs for half section **12*a* are connected between terminals 21 and 23 and terminals 21 and 22** respectively. The first leg includes crystal elements X1 and X3 tied in parallel and the second leg comprises crystal elements X1 and X2 connected in parallel. Crystal elements X2 and X3 resonate respectively at a low and high frequency relative to the low and high frequencies of the band-pass of FIG. 5. Crystal elements X1 preferably resonate at a slightly lower frequency than crystal element X2 and provide greater selectivity on the low frequency side of the response curve of FIG. 2.

Half section **12*b* has its first and second legs connected between terminals 23 and 24 and terminals 22 and 24** respectively. The first leg comprises crystal elements X4 and X6 connected in parallel and the second leg includes crystal elements X4 and X5 tied in parallel. Crystal elements X5 and X6 resonate respectively at a low and high frequency relative to the low and high frequencies of the band-pass of FIG. 5. Crystal elements X4 preferably resonate at a frequency slightly greater than crystal element X6 and provide the greater selectivity on the high frequency side of the response curve of FIG. 3.

The third half section has its first leg, with crystal elements X1 and X3 tied in parallel, connected between terminals 25 and 27. Its second leg, with crystal elements X1 and X2 connected in parallel, is connected between terminals 25 and 26. Half section 13 is structurally the same as half section **12*a*** and therefore exhibits a frequency response having substantially greater selectivity on the low frequency side than on the high frequency side of the half section band-pass response, as shown in FIG. 2.

A shunt circuit is connected between terminals 22 and 23 and comprises a transformer T2 center tapped to ground and in parallel with variable capacitor C8. The shunt circuit is designed to provide sufficient bandwidth to couple the desired band of frequencies from half section 12*a* to half section 12*b* of full section 12. The coupling coefficient between the two sides of transformer T2 is preferably as close to a value of one as possible. It is noted that each end of transformer T2 is connected to both half sections 12*a* and 12*b*. In this manner, one transformer is used instead of two.

The parallel circuit including inductor L3 and variable capacitor C9 connected between terminal 24 and ground cooperates with resistance R1 attached between terminals 24 and 25 to provide isolation between full section 12 and half section 13. The tuning of variable capacitor C9 may serve to improve ripple occurring in the frequency band-pass.

The parallel circuit appearing across terminals 26, 27 comprising the primary side of transformer T3 and variable capacitor C10 provides the proper loading for half section 13. The primary of transformer T3 is center tapped to ground.

The output circuit 14 establishes a low output impedance across output terminals 28, 28' steps down the impedance seen on the primary side. The output impedance is optimized by capacitor C11.

The input circuit 10 serves the dual function of being an impedance matching device and a "spur" rejection filter. The matching of the input impedance of the filter to the load placed across input terminals 20, 20' is accomplished primarily by the portion of transformer T1 across the input terminals 20, 20'. Preferably the impedance of the input circuit is of a low value. The input impedance is optimized with capacitor C1.

The "spur" rejection feature of the input circuit substantially eliminates the unwanted electrical vibrations which occur when quartz crystal vibrates. The input circuit 10 is an embodiment of my invention disclosed in my copending application, entitled "Improved Crystal Filter," Ser. No. 360,521, filed on Apr. 17, 1964, and designated numeral 1 in FIG. 1 therein.

The circuit values for an embodiment of the frenquency band-pass filter in FIG. 1 may be as follows: The capacitance in micromicrofarads (μμf.) are: C1 is 15 μμf., C2 is 160 μμf., C5 is 50 μμf., C7 is 160 μμf., C11 is 15 μμf. and variable capacitors C3, C4, C6, C8, C9, C10 and C11 are preferably tunable between 8 and 50 μμf.

The inductance values in microhenries for the inductors L and transformers T are: T1 from terminals 21' to 20' is 42.5 μh. at 2.5 megacycles and has 82 turns of No. 32 wire, T1 from terminals 20 to 20' is 25 μh. at 2.5 megacycles and has 17.5 turns of No. 32 wire, L1 is 85 μh. at 2.5 megacycles and has 85 turns of No. 34 wire, L3 is 42.5 μh. at 2.5 megacycles and has 82 turns of No. 32 wire, T2 is 60 μμf. at 1.75 megacycles and has 60 turns of bifilar wound No. 32 wire (the transformer is shown center tapped to ground to divide the inductance in half), L3 is 90 μμf. at 1.75 megacycles and has 120 turns of No. 34 wire, T3 has a primary side center tapped to ground between terminals 26 and 27 and measures 45μμf. at 1.75 megacycles for 140 turns of No. 32 wire, T3 has a secondary side between terminals 28 and 28' that measures 45 μμf. at 1.75 megacycles for 15 turns of No. 32 wire.

The transformers and inductors are preferably wound on iron core toroids having an inside diameter of .245 to .254 inch, an outside diameter of .432 to .442 inch and a thickness of .187±.01 inch. On a toroid of this type, 17 turns of No. 24 wire evenly spaced throughout the entire circumference reads 100 μμf. and has a Q of 180 for a 12 megacycle frequency. It has been found that the Permacore No. 48 (57–6187–24) toroid is quite suitable for the inductors and transformers used in the described embodiment. (Permacore is a division of Radio Cores Inc. with offices located at 9540 Tulley Ave., Oaklawn, Ill.)

Resistance R1 is 220 ohms.

The piezoelectric crystals preferably have an incremental band of resonant frequencies *df* of 3.5 kilocycles, capacitance of the crystal element and holder $C_o$ equal to 4.6 μμf. and a resistance $R_s$ less than 50 ohms. The frequency of resonance, *fr*, in kilocycles for the crystals are: X1—1749.850, X2—1750.700, X3—1753.190, X4—1754.450, X5—1750.150, X6—1753.025.

The crystal filter network 11 having the above listed component values meets the following design requirements: a maximum of two (2) decibels attenuation and a maximum insertion loss of six (6) decibels from 1750.300 to 1753.5 kc., and an attenuation of greater than sixty (60) decibels for frequencies less than 1749.700 kc. and greater than 1754.500 kc.

Tables 1 through 4 below, more particularly indicate the contribution of the individual sections to the final filter response curve of FIG. 5. The attenuation and frequency data given in Tables 1, 2, 3 and 4 correspond to the attenuation A and frequency *f* points on the response curve of FIGS. 2, 3, 4 and 5 respectively. The data for half section 12*a* (Table 1), half section 12*b* (Table 2), and full section 12 (Table 3) were taken separated from the crystal filter network 11 and therefore due to loading, there would be a slight attenuation variation from the table values when the section are connected together.

TABLE 1.—HALF SECTION 12*a* AND 13 (SEE FIG. 2)

| Attenuation in decibels: | Frequency in kc. |
|---|---|
| 50 | 1749.770 |
| 40 | 1749.949 |
| 30 | 1750.000 |
| 10 | 1750.130 |
| 2 | 1750.205 |
| 0 | 1750.622 |
| 0.5 (ripple) | 1751.042 |
| 0 | 1751.753 |
| 0.35 (ripple) | 1752.705 |
| 0 | 1753.319 |
| 2 | 1754.044 |
| 10 | 1754.955 |
| 30 | 1757.786 |
| 50 | 1760.112 |
| 60 | 1760.324 |

TABLE 2.—HALF SECTION 12*b*

| Attenuation in decibels: | Frequency in kc. |
|---|---|
| 40 | 1739.532 |
| 30 | 1742.225 |
| 20 | 1745.569 |
| 10 | 1747.892 |
| 3 | 1749.194 |
| 2 | 1749.406 |
| 0 | 1750.320 |
| 0 | 1753.310 |
| 2 | 1753.774 |
| 10 | 1753.980 |
| 20 | 1754.121 |
| 30 | 1754.230 |
| 40 | 1754.561 |
| 46 | 1754.704 |

TABLE 3.—FULL SECTION 12

| Attenuation in decibels: | Frequency in kc. |
|---|---|
| 60 | 1749.622 |
| 50 | 1749.939 |
| 30 | 1750.000 |
| 20 | 1750.054 |

TABLE 3.—Continued

| Attenuation in decibels: | Frequency in kc. |
|---|---|
| 10 | 1750.121 |
| 2 | 1750.200 |
| 0 | 1750.763 |
| 2 | 1753.788 |
| 10 | 1753.950 |
| 20 | 1754.072 |
| 30 | 1754.179 |
| 50 | 1754.490 |
| 60 | 1764.060 |

TABLE 4.—FILTER NETWORK 11

| Attenuation in decibels: | Frequency in kc. |
|---|---|
| 60 | 1749.980 |
| 50 | 1750.005 |
| 30 | 1750.114 |
| 20 | 1750.157 |
| 10 | 1750.197 |
| 2 | 1750.271 |
| 0.6 | 1750,287 |
| 1 (ripple) | 1750.481 |
| 0 | 1750.904 |
| 0.6 (ripple) | 1751.491 |
| 0 | 1753.061 |
| 2 | 1753.830 |
| 10 | 1753,970 |
| 20 | 1754.049 |
| 30 | 1754.132 |
| 60 | 1754.345 |

The data given in the above tables clearly show the effects of the half sections upon the overall frequency response. In particular, Table 4 leaves no doubt that the response for the crystal filter network 11 has substantially more selectivity on the low frequency side than on the high frequency side thereof. The opposite would occur if a half section similar to 12*b* were used for the third half section 13.

The attenuation behavior for the half sections 12*a*, 12*b* and 13 may be predetermined by drawing the curves for impedance or admittance versus frequency for the legs of the half sections and applying the following attenuation equation:

$$A=20\log\frac{1+\sqrt{\frac{Za}{Zb}}}{1-\sqrt{\frac{Za}{Zb}}}$$

A=attenuation in decibels;
Za=impedance for one leg of the half section; and
Zb=impedance for the other leg of the half section.

FIGS. 6 through 9 illustrate the behavior of half section 12*a* (or 13) with crystal elements X1, X2 and X3 resonating at the frequencies given above. The frequency values along the horizontal axis are for convenience only and should in no way be construed as a limitation upon circuit performance.

Figure 6:
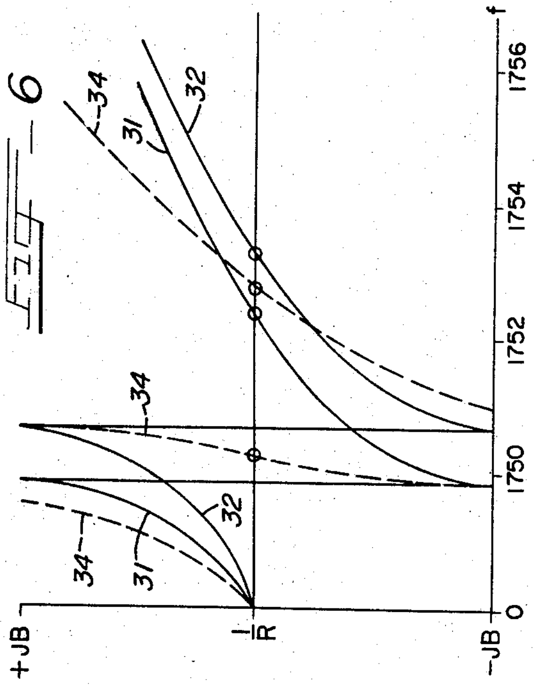
FIG. 6 shows the admittance versus frequency curves for crystals X1 and X2 of the half section leg between terminals 21 and 22 and the resultant curve of the same.

FIG. 6 illustrates the admittance versus frequency curves for crystals X1 (resonant frequency of 1749.80 kilocycles) and X2 (resonant frequency of 1750.70 kilocycles) of the leg between terminals 21 and 22 of half section 12*a* and designated by the reference characters 31 and 32, respectively.

Curve 34 is the resultant of curves 31 and 32 and is derived by point by point addition. The resultant curve 34 shown in dotted line has infinite susceptance at approximately 1749.80 kilocycles and 1750.70 kilocycles and zero susceptance at 1750.25 kilocycles and 1752.80 kilocycles.

Figure 7:
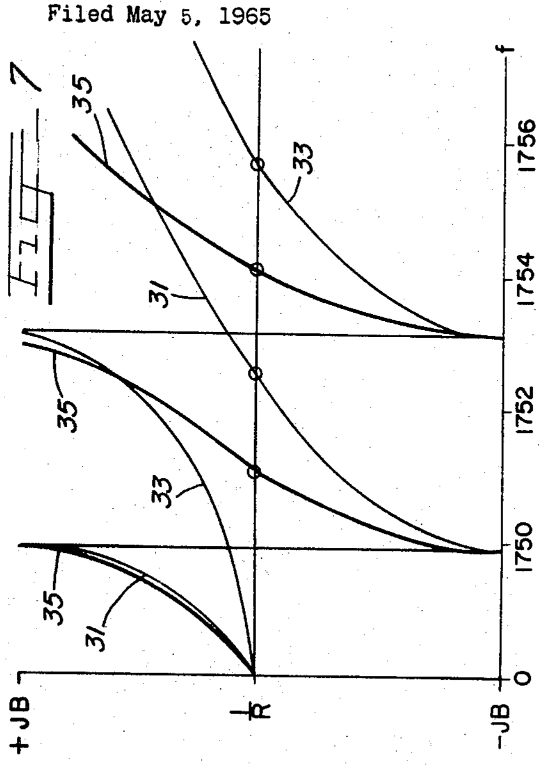
FIG. 7 shows the admittance versus frequency curves for the crystals X1 and X3 of the half section leg between terminals 21 and 23 and the resultant curve of the same.

FIG. 7 shows the admittance versus frequency curves 31, 33 for crystals X1 (resonant frequency of 1750.70 kilocycles) and X3 (resonant frequency of 1753.19 kilocycles) of the other leg of half section 12*a*. The resultant curve 35, as in FIG. 6 is the point by point addition of the other two curves. Resultant curve 35 has infinite susceptance approximately at 1749.80 kilocycles and 1753.190 kilocycles and zero susceptance approximately 1751.05 kilocycles and 1754.45 kilocycles.

Figure 8:
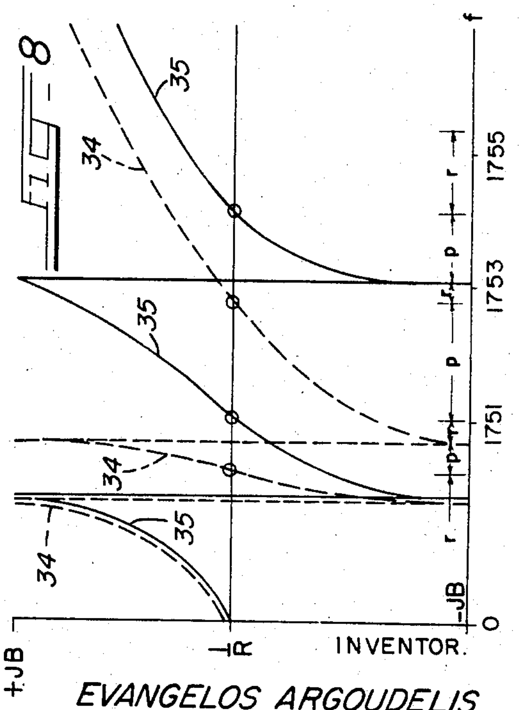
FIG. 8 illustrates the resultant admittance curves of FIGS. 6 and 7 to more clearly indicate the infinity and zero points for each curve.

In FIG. 8, the approximate admittance curves 34 and 35 of FIGS. 6 and 7 are shown together to more particularly indicate the frequencies for infinite and zero susceptance. The infinity lines for the dotted admittance curve 34 are also shown in dotted lines.

In FIGS. 6, 7 and 8, the vertical axis represents the admittance for the crystals. Zero susceptance appears along the medial line representing the crystal conductance $1/R$. As the curves move further either plus or minus from center line $1/R$, the admittance becomes predominately plus or minus susceptance ±JB.

Figure 9:
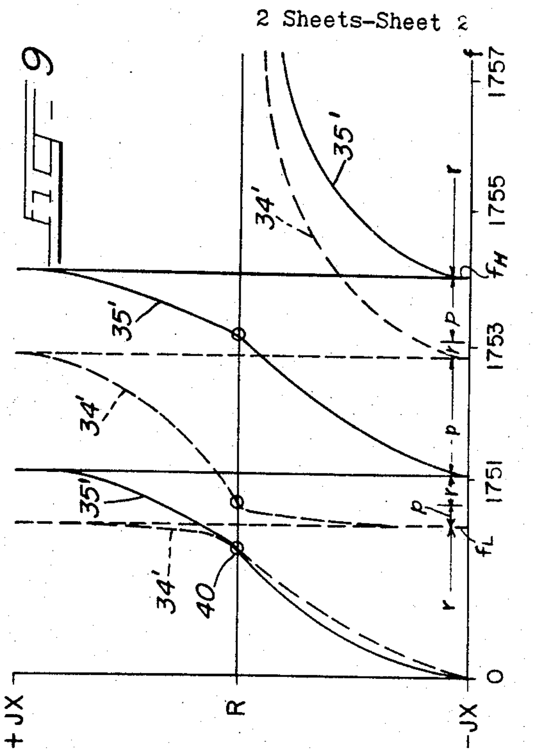
FIG. 9 illustrates the corresponding impedance curves for the admittance curves of FIG. 8.

FIG. 9 shows the impedance curves designated by the prime of the numerals for the corresponding resultant admittance curves of FIG. 8. As the impedance curves 34′ and 35 extend further plus or minus from line R, the impedance becomes predominately plus or minus reactance ±JX. Purely resistive impedance or zero reactance occur at the frequencies the curves cross the medially positioned line R. Note that at only the point designated by the numeral 40 (approximately 1749.80 kilocycles) are the reactances of each leg equal. If the value of the impedance at point 40 is inserted into the above attenuation equation, the attenuation A calculates to infinity. For actual circuit values, point 40 exhibits high frequency rejection as shown in FIG. 2, and is a result of each leg having the crystal element X1 resonating in the vicinity of the low frequency side of the band-pass response. This accounts for the attenuation curve of half section 12*a* having substantially more selectivity on the low frequency side than on the high frequency side thereof. In FIG. 3, the corresponding high rejection point to 40 is designated 41 and occurs near the high frequency side of the band-pass response.

The high rejection point 40 (or 41) occurs at the frequency the impedance curve for each leg of the half section intersect and is usually when the reactances are equal (the resistance is normally negligible). The value of the reactances when the curves intersect need not be zero as is the case in the illustrated embodiment.

With further reference to FIG. 9, the area of frequency passband for the half section is indicated by the letter *p* and the area of frequency rejection is indicated by the letter *r*. The upper and lower cut-off frequencies of the response curve are designated by $f_H$ and $f_L$ respectively. Note that the passband area is interrupted by two narrow bands of rejection *r* which in actuality appear as ripple in the passband. For approximate attenuation values of the frequency response other than the poles and zero, the attenuation equation given above could be used.

Therefore, from the impedance curves of FIG. 9 or the admittance curves of FIG. 8, the performance of a half section of my invention could be sufficiently predicted by the design engineer.

The basic part of my three terminal half section which includes the band-pass forming crystals as X2 and X3 of half section 12*a*, is known in the art as a lattice equivalent. The lattice equivalent halves the number of crystals required for the full-lattice filter. The design theory of the lattice equivalent is discussed on page 235 in the handbook entitled "Reference Data for Radio Engineers," fourth edition (appeared first in the fourth printing), published by the International Telephone and Telegraph Corporation, and in a paper by M. Dishal, "Practical Modern Network Theory Design for Crystal Filters," published in the IRE 1957 National Convention Record, Part 8.

The versatility of the invention herein is quite suitable for single-sideband filtering. For example, if upper single-sideband filtering is required, the crystal filter network 11 of FIG. 1 would be used. However, for lower single-sideband filtering, the combination of the basic full section 12 with half section 12*b* would be preferred and would exhibit a response that is highly selective on the high side and less selective on the low side.

Furthermore, my invention is also adaptable for providing a wide range of bandwidths by the proper selection of crystal frequencies. Preferably, the frequency for the selectivity forming crystals should be less than the frequency of the low frequency band-pass forming crystal for the low frequency selective half section and greater than the high frequency band-pass forming crystal for the high frequency selective half section. In this manner, the bandwidth may be controlled and varied.

From the foregoing description and drawings, it should be apparent that I have provided a novel band-pass crystal filter of a greatly simplified and improved construction which accomplishes the aforestated objects and features in a remarkably unexpected fashion. A crystal element is included in each leg of an equivalent lattice network or the like which resonates at a low frequency near the low frequency side of the band-pass to provide a band-pass response that is substantially more selective on the low frequency side than on the high frequency side thereof. Conversely, a crystal element included in each leg of an equivalent lattice network which resonates at a high frequency near the high frequency side of the band-pass provides a band-pass response that is substantially more selective on the high frequency side than on the low frequency side thereof. The combining of these two types of half sections produces a full section filter network exhibiting a highly selective band-pass response which significantly reduces the number of crystal elements heretofore necessary for accomplishing the same result. If desired, the full section may be symmetrical.

The word "near" is used to describe the position of the selectivity forming crystals of my invention and the other crystals of the network with respect to the sides of the passband and is meant to include areas within and outside the passband as well as points on the sides of the passband.

It is believed that my invention, its mode of construction and assembly, and many of its advantages should be readily understood from the foregoing without further description, and it should also be manifest that while preferred embodiments of this invention have been shown and described for illustrative purposes, the structural details are nevertheless capable of wide variation within the purview of my invention as defined in the appended claims.

What I claim and desire to secure by Letters Patent of the United States is:

1. A piezoelectric crystal filter arrangement for passing a narrow frequency band of electrical signals from a source having a relatively wide frequency band of electrical signals comprising:

an input circuit for receiving said wide band of signals;

an output circuit for receiving said narrow band of signals;

at least one unsymmetrical half section interposed between said input and output circuit to pass said narrow frequency band and to substantially attenuate the remainder of said wide band, said half section comprising a first leg coupled to a second leg;

a first piezoelectric crystal element included in said first leg, said first crystal element resonating at a high frequency near the high frequency side of said narrow frequency band;

a second piezoelectric crystal element included in said second leg, said second crystal element resonating at a low frequency near the low frequency side of said narrow frequency band, the coacting of said first and second crystal elements essentially forming the frequency band-pass of said half section;

a third piezoelectric crystal element coupled to said first leg; and a fourth piezoelectric crystal element coupled to said second leg, said third and fourth crystal elements resonating at frequencies near one side of said narrow band to provide substantially greater selectivity on said one side than on the other side of said half section band-pass.

2. A crystal filter arrangement as defined in claim 1, wherein said third crystal element is coupled effectively in parallel with said first crystal element and said fourth crystal element is coupled effectively in parallel with said second crystal element.

3. A crystal filter arrangement as defined in claim 1, wherein said third crystal element is substantially identical to said fourth crystal element, said third and fourth crystal elements resonating at a low frequency near the low frequency side of said narrow frequency band to provide substantially greater selectivity on the low frequency side than on the high frequency side of said half section band-pass.

4. A crystal filter arrangement as defined in claim 1, wherein said third crystal element is substantially identical to said fourth crystal element, said third and fourth crystal elements resonating at a high frequency near the high frequency side of said narrow frequency band to provide substantially greater selectivity on the high frequency side than on the low frequency side of said half section band-pass.

5. A crystal filter arrangement as defined in claim 3, wherein said third and fourth crystal elements resonate at frequencies slightly less than said second crystal element.

6. A crystal filter arrangement as defined in claim 4, wherein said third and fourth crystal elements resonate at frequencies slightly greater than said first crystal element.

7. A piezoelectric crystal filter arrangement for passing a narrow frequency band of electrical signals from a source having a relatively wide frequency band of electrical signals comprising:

an input circuit for receiving said wide band of signals;

an output circuit for receiving said narrow band of signals;

at least one substantially symmetrical full section interposed between said input and output circuit to pass said narrow frequency band and to substantially attenuate the remainder of said wide band, said one full section comprising a first unsymmetrical half section coupled to a second unsymmetrical half section, each of said unsymmetrical half sections including a first leg connected to a second leg;

a first piezoelectric crystal element included in each of said first legs, each of said first crystal elements resonating at a high frequency near the high frequency side of said narrow frequency band;

a second piezoelectric crystal element included in each of said second legs, each of said second crystal elements resonating at a low frequency near the low frequency side of said narrow frequency band, the coacting of said first and second crystal elements essentially providing the frequency band-pass of said full section;

a third piezoelectric crystal element coupled to each of said first legs; and a fourth piezoelectric crystal element coupled to each of said second legs, said third and fourth crystal elements of said first unsymmetrical half section resonating at a low frequency near the low frequency side of said narrow frequency band to provide substantially greater selectivity on the low frequency side than on the high frequency side of the frequency response of said first half section, said third and fourth crystal elements of said second unsymmetrical half section resonating at a high frequency near the high frequency side of said narrow frequency band to provide substantially greater selectivity on the high frequency side than on the low frequency side of the frequency response of said second half section, said first and second unsymmetrical sections of said one full section cooperating to provide a substantially symmetrical response of said narrow band.

8. A piezoelectric crystal filter device for passing a narrow frequency band of electrical signals from a source having a relatively wide frequency band of electrical signals comprising:

an input circuit for receiving said wide band of signals;

an output circuit for receiving sad narrow band of signals;

a first unsymmetrical half section coupled to a second unsymmetrical half section, said first and second half sections forming a substantially symmetrical full section, a third unsymmetrical half section coupled to said full section, said full section and said third half section being interposed between said input and output circuits to pass said narrow frequency band and to attenuate the remainder of said wide band to at least a particular magnitude level, each of said unsymmetrical half sections including a first leg connected to a second leg;

a first piezoelectric crystal element included in each of said first legs, each of said first crystal elements resonating at a high frequency near the high frequency side of said narrow frequency band;

a second piezoelectric crystal element included in each of said second legs, each of said second crystal elements resonating at a low frequency near the low frequency side of said narrow frequency band, the coacting of said first and second crystal elements essentially providing the frequency band-pass of said narrow band;

a third piezoelectric crystal element coupled to each of said first legs; and a fourth piezoelectric crystal element coupled to each of said second legs, said third and fourth crystal elements of said first unsymmetrical half section resonating at a low frequency near the low frequency side of said narrow frequency band to provide substantially greater selectivity on the low frequency side than on the high frequency side of the frequency response of said first half section, said third and fourth crystal elements of said second unsymmetrical half section resonating at a high frequency near the high frequency side of said narrow frequency band to provide substantially greater selectivity on the high frequency side of the frequency response of said second half section, said third and fourth crystal elements of said third unsymmetrical half section resonating at a low frequency near the low frequency side of said narrow frequency band to provide greater selectivity on the low frequency side than on the high frequency side of the frequency response of said third half section, said first, second and third unsymmetrical half sections cooperating to provide the frequency response of said narrow band, said response of said narrow band having slightly greater selectivity on the low side than on the high side.

9. A crystal filter as defined in claim 8, wherein said third and fourth crystals of said third unsymmetrical half section resonating at a high frequency near the high frequency side of said narrow frequency band to provide more selectivity on the high frequency side than on the low frequency side of the frequency response of said narrow band.

10. A piezoelectric crystal filter arrangement for passing a narrow frequency band of electrical signals from a source having a relatively wide frequency band of electrical signals comprising:

an input circuit for receiving said wide band of signals;

an output circuit for receiving said narrow band of signals;

at least one unsymmetrical half section interposed between said input and output circuit to pass said narrow frequency band and to substantially attenuate the remainder of said wide band, said one half section including a first, second and third terminal, a first leg connected between said first and second terminals and a second leg connected between said first and third terminals;

a first piezoelectric crystal element included in said first leg, said first crystal element resonating at a high frequency of said narrow frequency band;

a second piezoelectric crystal element included in said second leg, said second crystal element resonating at a low frequency of said narrow frequency band, the coacting of said first and second crystal elements essentially forming the frequency band-pass of said half section;

a third piezoelectric crystal element coupled to said first leg;

a fourth piezoelectric crystal element coupled to said second leg, said third and fourth crystal elements resonating at frequencies near one side of said narrow band to provide substantially greater selectivity on said one side than on the other side of said half section band-pass;

a first impedance means connected between said first terminal and a reference level to provide proper impedance matching to said one half section;

a second impedance means connected between said second and third terminals to provide the loading for substantially deriving the proper bandwidth for said one half section.

11. A crystal filter arrangement as defined in claim 10, wherein said first and third piezoelectric crystal elements are connected in parallel between said first and second terminals and said second and fourth piezoelectric crystal elements are connected in parallel between said first and third terminals.

References Cited

UNITED STATES PATENTS

| | | | |
|---|---|---|---|
| 2,216,541 | 10/1940 | Och | 333—72 |
| 2,266,658 | 12/1941 | Robinson | 333—72 |
| 3,344,369 | 9/1967 | Bies et al. | 333—72 |

OTHER REFERENCES

Kosowsky: "Proc. IRE," February 1958, pp. 419–429.

ROY LAKE, *Primary Examiner.*

DARWIN R. HOSTETTER, *Assistant Examiner.*

U.S. Cl. X.R.

333—77